United States Patent
Hubert

(10) Patent No.: US 11,835,638 B2
(45) Date of Patent: Dec. 5, 2023

(54) METHOD AND SYSTEM FOR GEOLOCATING A TERMINAL OF A WIRELESS COMMUNICATION SYSTEM

(71) Applicant: SIGFOX, Labege (FR)

(72) Inventor: Loïc Hubert, Saint-Sulpice-sur-Lèze (FR)

(73) Assignee: SIGFOX, Labege (FR)

( * ) Notice: Subject to any disclaimer, the term of this patent is extended or adjusted under 35 U.S.C. 154(b) by 463 days.

(21) Appl. No.: 17/253,114

(22) PCT Filed: Jun. 17, 2019

(86) PCT No.: PCT/FR2019/051461
§ 371 (c)(1),
(2) Date: Dec. 16, 2020

(87) PCT Pub. No.: WO2019/243719
PCT Pub. Date: Dec. 26, 2019

(65) Prior Publication Data
US 2021/0263127 A1    Aug. 26, 2021

(30) Foreign Application Priority Data
Jun. 18, 2018  (FR) ..................... 18 55328

(51) Int. Cl.
*G01S 5/00*      (2006.01)
*H04W 64/00*   (2009.01)
*G01S 5/02*      (2010.01)

(52) U.S. Cl.
CPC .......... *G01S 5/0054* (2013.01); *G01S 5/0036* (2013.01); *G01S 5/018* (2020.05); *G01S 5/0205* (2013.01); *H04W 64/00* (2013.01)

(58) Field of Classification Search
CPC ..... G01S 5/0054; G01S 5/0036; H04W 64/00
See application file for complete search history.

(56) References Cited

U.S. PATENT DOCUMENTS

| | | | |
|---|---|---|---|
| 2007/0066334 A1* | 3/2007 | Butts ...................... | H04W 4/33 455/443 |
| 2017/0180928 A1 | 6/2017 | Sharma et al. | |
| 2019/0222964 A1* | 7/2019 | Thomas ................ | H04W 4/024 |

* cited by examiner

*Primary Examiner* — Muthuswamy G Manoharan
(74) *Attorney, Agent, or Firm* — H&I PARTNERS; C. Andrew Im; Jean-Christophe Hamann

(57) ABSTRACT

A method for geolocating a terminal of a wireless communication system. The terminal includes a positioning device for obtaining a precise geographical position of the terminal. An access network of the communication system estimates an approximate geographical position of the terminal. In order to limit the size of the messages exchanged between the terminal and the access network, only a truncated part of the information about the precise geographical position of the terminal is transmitted by the terminal to the access network. The access network determines the precise geographical position of the terminal by combining the truncated information received from the terminal with the approximate geographical position estimated by the access network.

5 Claims, 4 Drawing Sheets

METHOD AND SYSTEM FOR GEOLOCATING A TERMINAL OF A WIRELESS COMMUNICATION SYSTEM

RELATED APPLICATIONS

This application is a § 371 application of PCT/FR2019/051461 filed Jun. 17, 2019, which claims priority from French Patent Application No. 18 55328 filed Jun. 18, 2018, each of which is incorporated herein by reference in its entirety.

TECHNICAL FIELD

The present invention relates to a method and a system for geolocating a terminal of a wireless communication system. The invention is particularly well suited to the context of the Internet of Things in applications requiring geolocation.

BACKGROUND OF THE INVENTION

There currently exist numerous solutions for determining the geographical position of a terminal of a wireless communication system.

For example, the terminal may incorporate a positioning system enabling it to determine the geographical position thereof. The terminal may then send a message indicating this geographical position to an access network of the wireless communication system.

Such a solution does however have the drawback that transmitting the information on the geographical position to the access network may be expensive in terms of data size (number of bits used for encoding this information). This is because, in wireless communication systems with a low bit rate and low electricity consumption for the Internet of Things, bit rates are by design low, generally between a few tens of bits per second and a few kilobits per second. In such systems, it is necessary to limit the number of bits in the messages exchanged between a terminal and the access network for the purpose of reducing firstly the duration of occupation of the frequency band used in order to preserve the radio resources of the system, and secondly the duration of transmission of a message in order to limit the electrical consumption of the terminal.

Other solutions are based on methods implemented in the access network in order to estimate the geographical position of a terminal.

These are for example multilateration methods based on measurements of propagation times of a radio signal exchanged between the terminal and one or more base stations of the access network (methods of the TOA type, "Time of Arrival", or of the TDOA type, "Time Difference of Arrival").

Other known multilateration methods are based on a received power level (or RSSI, "Received Signal Strength Indicator") for a radio signal exchanged between the terminal and the access network.

Determining the geographical position of the terminal from the geographical position of one or more base stations in the coverage of which the terminal is situated is also known.

According to yet another example, automatic learning methods may make it possible to determine the geographical position of a terminal from a radio signature of the terminal at this position (these methods are known as "fingerprinting").

These methods for estimating the geographical position of a terminal by the access network are nevertheless often imprecise. The precision of the geographical position of the terminal estimated by the access network is in fact generally worse than the precision of the geographical position that the terminal can obtain via the positioning device that it incorporates.

OBJECT AND SUMMARY OF THE INVENTION

The objective of the present invention is to remedy all or some of the drawbacks of the prior art, in particular those disclosed above, by proposing a solution that makes it possible to determine the geographical position of a terminal of a wireless communication system precisely while limiting the quantity of information exchanged between the terminal and an access network of the communication system.

To this end, and according to a first aspect, the present invention proposes a method for geolocating a terminal of a wireless communication system. The wireless communication system comprises an access network configured to estimate an approximate geographical position of said terminal. The terminal comprises a positioning device for obtaining a precise geographical position of the terminal, the precision of which is better than the precision of the approximate geographical position estimated by the access network. The method includes the following steps:

- calculation by the terminal of truncated information on the precise geographical position by breaking down said precise geographical position into a first part and a second part, the first part varying less quickly than the second part when the terminal moves, the truncated information representing the second part of the precise geographical position,
- transmission by the terminal of the truncated information in a message intended for the access network,
- estimation of the approximate geographical position of the terminal by the access network,
- extraction by the access network of the truncated information from the message received coming from the terminal,
- determination by the access network of the precise geographical position of the terminal from the truncated information and from the approximate geographical position.

Such arrangements make it possible to limit the size of the messages exchanged between the terminal and the access network. This is because only a truncated part of the information on the precise geographical position obtained by the terminal is transmitted to the access network by the terminal. The access network is configured to determine the precise geographical position of the terminal by combining the truncated information received from the terminal with the approximate geographical position estimated by the access network.

In particular embodiments, the invention may further include one or more of the following features, taken in isolation or in accordance with all the technically possible combinations.

In particular embodiments, the geographical position comprises a latitude and a longitude as geographical coordinates.

In particular embodiments:
the latitude and the longitude each correspond to a value encoded respectively in N and M bits,
the latitude $Lat_1$ and the longitude $Lng_1$ of the precise geographical position obtained by the terminal can be written in the form:

$$Lat_1 = N_1 \times 2^n + n_1$$

$$Lng_1 = M_1 \times 2^m + m_1$$

where $N_1$, $n_1$, n, $M_1$, $m_1$ and m are positive integer numbers, $n_1$ and $m_1$ corresponding respectively to the n least significant bits of the latitude $Lat_1$ and to the m least significant bits of the longitude $Lng_1$ of the precise geographical position obtained by the terminal,
the latitude $Lat_2$ and the longitude $Lng_2$ of the approximate geographical position estimated by the access network can be written in the form:

$$Lat_2 = N_2 \times 2^n + n_2$$

$$Lng_2 = M_2 \times 2^m + m_2$$

where $N_2$, $n_2$, $M_2$ and $m_2$ are positive integer numbers, $n_2$ and $m_2$ corresponding respectively to the n least significant bits of the latitude $Lat_2$ and to the m least significant bits of the longitude $Lng_2$ of the approximate geographical position estimated by the access network,
the truncated information includes the n least significant bits of the latitude $Lat_1$ and the m least significant bits of the longitude $Lng_1$ of the precise geographical position obtained by the terminal,
the determination by the access network of the precise geographical position of the terminal from the truncated information and from the approximate geographical position comprises:
a determination of the latitude $Lat_1$ as a function of $N_2$ and of $n_1$, and
a determination of the longitude $Lng_1$ as a function of $M_2$ and of $m_1$.

In particular embodiments:
the numbers n and m are chosen so that the precision of the approximate geographical position estimated by the access network is such that, whatever the geographical position of the terminal, the following formulae are satisfied:

$$|Lat_1 - Lat_2| < 2^{(n-1)}$$

$$|Lng_1 - Lng_2| < 2^{(m-1)}$$

the determination by the access network of the precise geographical position of the terminal from the truncated information and from the approximate geographical position comprises:
a determination of the latitude $Lat_1$ in accordance with:

$$Lat_1 = \begin{cases} (N_2 + 1) \times 2^n + n_1 & \text{if } (n_1 - n_2) \leq (-1) \times 2^{(n-1)} \\ (N_2 - 1) \times 2^n + n_1 & \text{if } (n_1 - n_2) \geq 2^{(n-1)} \\ N_2 \times 2^n + n_1 & \text{otherwise} \end{cases}$$

a determination of the longitude $Lng_1$ in accordance with:

$$Lng_1 = \begin{cases} (M_2 + 1) \times 2^m + m_1 & \text{if } (m_1 - m_2) \leq (-1) \times 2^{(m-1)} \\ (M_2 - 1) \times 2^m + m_1 & \text{if } (m_1 - m_2) \geq 2^{(m-1)} \\ M_2 \times 2^m + m_1 & \text{otherwise} \end{cases}$$

In particular embodiments, the estimation of the approximate geographical position by the access network is obtained by one of the following methods:
a multilateration method based on the propagation time of a radio signal exchanged between the terminal and the access network,
a multilateration method based on a received power level for a radio signal exchanged between the terminal and the access network,
a determination of the geographical position of the terminal from the geographical position of one or more base stations in the coverage of which the terminal is located, and
an automatic learning method for associating a radio signal with a geographical position.

In particular embodiments, the access network is a wireless low power wide area network.

Such an access network is known by the acronym LPWAN, "low-power wide-area network". Particularly well suited for applications of the "connected objects" type, it allows data exchanges over distances that may range from a few kilometers to several tens or even several hundreds of kilometers with a bit rate varying from a few tens of bits per second up to a few hundreds of kilobits per second.

According to a second aspect, the present invention relates to a terminal of a wireless communication system including a positioning device for obtaining a precise geographical position of the terminal, the terminal being configured to:
calculate truncated information on the precise geographical position by breaking down said precise geographical position into a first part and a second part, the first part varying less quickly than the second part when the terminal moves, the truncated information representing the second part of the precise geographical position, and
transmit the truncated information in a message intended for an access network of the wireless communication system.

According to a third aspect, the present invention relates to an access network of a wireless communication system. The wireless communication system comprises a terminal according to any one of the preceding embodiments, and the access network is configured to:
estimate an approximate geographical position of the terminal,
extract the truncated information from the message received coming from the terminal, and
determine the precise geographical position of the terminal from the truncated information and from the approximate geographical position.

According to a fourth aspect, the present invention relates to a wireless communication system comprising a terminal and an access network according to any one of the preceding embodiments.

BRIEF DESCRIPTION OF THE DRAWINGS

The invention will be understood better from a reading of the following description, given by way of in no way limitative example, and made with reference to FIGS. 1 to 5, which show.

In these figures, references identical from one figure to another designate identical or similar elements. For reasons of clarity, the elements shown are not necessarily to the same scale, unless mentioned to the contrary.

DETAILED DESCRIPTION OF EMBODIMENTS

The present invention finds a particularly advantageous, although in no way limitative, application in wireless communication systems for the Internet of Things (IoT) or for applications of the M2M ("machine-to-machine") type.

In such a wireless communication system, the bit rates are by design low, generally less than a few hundreds of kilobits per second.

In particular, in ultra narrow band wireless communication systems, the bit rates are generally between a few tens of bits per second and a few kilobits per second. "Ultra narrow band" (UNB) means that the instantaneous frequency spectrum of the radio signals emitted by the terminals has a frequency width of less than one kilohertz. The access network of such a communication system is a wireless wide-area network with low power consumption of the LPWAN type.

To optimize the capacity of the network, it is advantageous to limit the number of bits in the messages exchanged between the terminals and the access network, since this makes it possible to reduce the duration of the messages, and consequently to reduce the duration of occupation of the frequency band used for exchanging the data between the terminals and the access network.

Such a limitation to the number of bits in the messages is also required because limiting the duration of the messages exchanged gives rise to a reduction in the electrical consumption of the terminal since the terminal is in active mode for a shorter transmission or reception time.

Figure 1:
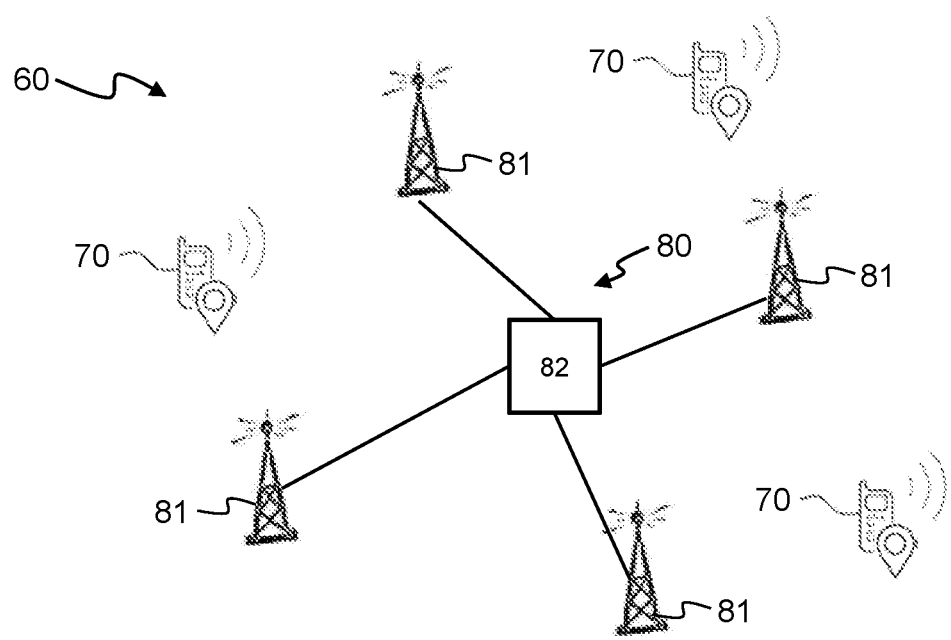
FIG. 1: a schematic representation of a wireless communication system.

FIG. 1 shows schematically a wireless communication system 60, for example of the UNB type, including a plurality of terminals 70 and an access network 80 including a plurality of base stations 81.

The terminals 70 and the base station 81 of the access network 80 exchange data in the form of radio signals. "Radio signal" means an electromagnetic wave propagating via non-cabled means, the frequencies of which lie in the traditional spectrum of radio waves (a few hertz to several hundreds of gigahertz).

For this purpose, each terminal 70 includes, in a conventional manner, a communication module adapted for sending a radio signal including a message intended for the access network 80, and for receiving a radio signal including a message coming from the access network 80.

In a similar manner, each base station 81 of the access network 80 includes, in a conventional manner, a communication module adapted for sending a radio signal including a message intended for a terminal 70, and for receiving a radio signal including a message coming from a terminal 70.

The terminals 70 are adapted for sending uplink messages over an uplink intended for the access network 80. The uplink messages are for example sent asynchronously. "Sending asynchronously" means that the terminals 70 autonomously determine when they transmit, without coordination of said terminals 70 with each other and with the base stations 81 of the access network 80.

Each base station 81 is adapted for receiving the uplink messages from the terminals 70 that are located within range thereof. Each uplink message thus received is for example transmitted to a server 82 of the access network 80, optionally accompanied by other information such as an identifier of the base station 81 that has received it, the measured power of said uplink message received, the time of reception of said uplink message, etc. The server 82 processes for example all the uplink messages received from the various base stations 81.

In the example considered, the access network 80 is configured to be able to estimate an approximate geographical position of a terminal 70.

The approximate geographical position of the terminal 70 is for example estimated by the server 82 of the access network. For this purpose, the server 82 includes for example a processing circuit including one or more processors and storage means (magnetic hard disk, electronic memory, optical disk, etc.) wherein a computer program product is stored, in the form of a set of program code instructions to be executed for implementing at least some of the steps of a method for geolocating a terminal 70 of the wireless communication system 60. Alternatively or in addition, the processing circuit of the server 82 includes one or more programmable logic circuits (FGPA, PLD, etc.), and/or one or more specialized integrated circuits (ASIC), and/or a set of discrete electronic components, etc., adapted for implementing said steps of the geolocation method.

For this purpose, a plurality of methods is known. For example, the access network 80 can estimate the approximate geographical position of the terminal 70 as being the geographical position of a base station 81 that has received a message sent by the terminal 70. If a plurality of base stations 81 can receive a message sent by the terminal 70, estimating the approximate geographical position of the terminal 70 according to the geographical positions of all the base stations 81 that receive the message sent by the terminal 70 (for example by defining a barycenter of these geographical positions) can also be envisaged.

According to another example, the access network 80 can estimate the distances that separate the terminal 70 from one or more base stations 81 by calculating the propagation time of a signal sent by the terminal 70 to the base stations 81 from the Times of Arrival (TOAs) or the Time Differences of Arrival (TDOAs) of this signal at the various base stations 81. It is then possible to estimate the position of the terminal 70 by multilateration if the geographical positions of the base stations 81 are known.

According to another example, it is possible to estimate the position of the terminal 70 by multilateration by determining the distances that separate the terminal 70 from a plurality of base stations 81 using a received power level (RSSI, "Received Signal Strength Indicator") received by each base station 81 for a message sent by the terminal 70 intended for the access network 80. This method is based on the fact that a radio signal is attenuated in a known manner in the atmosphere, and that the received power level for a message transported by a signal therefore also varies in a known manner according to the distance that separates the receiver and the transmitter of the signal.

According to yet another example, the method for estimating an approximate geographical position of the terminal 70 by the access network 80 can be based on machine learning that associate a fingerprint with a position of the geographical zone in question. Such a method is based on the hypothesis that a power level received by a base station 81 for a message sent by the terminal 70 located at a given position is stable over time. In concrete terms, it is a question of constructing, during a first calibration phase, a database that associates, with known geographical positions, a "radio signature" corresponding to all the RSSI levels measured for a terminal 70 at the position in question for a set of base stations 81 of the system 60. Next, during a search phase, a radio signature observed for the terminal 70 the position of which it is sought to estimate is compared with all the signatures of the database in order to estimate the geographical position of the terminal 70 from the geographical position or positions corresponding to the signature or signatures most resembling the radio signature observed.

The precision of the approximate geographical position estimated by the access network 80 is however sometimes insufficient for some applications.

In the example in question, the terminal 70 incorporates a positioning device for obtaining a precise geographical position of the terminal 70.

It is a case for example of a satellite positioning system (GNSS, "Global Navigation Satellite System") such as a GPS ("Global Positioning System") receiver.

The precision of the geographical position obtained by the terminal 70 from the positioning device is better than the precision of the approximate geographical position estimated by the access network 80. It is understood thereby that the distance between the exact geographical position of the terminal 70 and the geographical position obtained by the positioning device is generally less than the distance between the exact geographical position of the terminal 70 and the approximately geographical position estimated by the access network 80.

In a first embodiment, the geographical position of the terminal 70 comprises a latitude and a longitude as geographical coordinates.

By way of in no way limitative example, the latitude and the longitude of a geographical position are encoded in 24 bits (N=M=24). The most significant bit corresponds to a sign bit while the 23 least significant bits correspond to data bits encoding values lying between 0 and $2^{23}-1=8,388,607$.

In order to pass to a standard latitude value lying in an interval $[-90°; 90°]$, it should be noted that the 23 data bits make it possible to obtain a granularity of approximately $1.07 \times 10^{-5}$ degrees of arc per unit. Knowing that the distance on the surface of the terrestrial globe corresponding to one degree of arc is approximately 110 km, the use of 24 bits for encoding a latitude value makes it possible to define a latitude with a precision of around 1.2 meters on the surface of the terrestrial globe.

Likewise, in order to pass to a standard longitude value lying in an interval $[-180°; 180°]$, it should be noted that the 23 data bits make it possible to obtain a granularity of approximately $2.15 \times 10^{-5}$ degrees of arc per unit. The use of 24 bits for encoding a longitude value makes it possible to define a longitude with a precision of around 2.4 meters on the surface of the terrestrial globe.

By way of comparison:
- if the longitude were encoded in 16 bits with one sign bit and 15 data bits, then the granularity would be $5.5 \times 10^{-3}$ degrees of arc per unit, which would make it possible to obtain a precision of around 604.3 meters,
- if the longitude were encoded in 8 bits with one sign bit and 7 data bits, then the granularity would be 1.42 degrees of arc per unit, which would make it possible to obtain a precision of around 156 kilometers, and
- if the longitude were encoded in 32 bits with one sign bit and 31 data bits, then the granularity would be $8.4 \times 10^{-8}$ degrees of arc per unit, which would make it possible to obtain a precision of around one centimeter.

A geographical position including a latitude and a longitude each encoded in 24 bits makes it possible to obtain sufficient precision for a large number of applications. This corresponds however to six data bytes, which represents a significant size for a message that would contain this information, in particular for applications of the IoT type where it is sought to limit to the maximum possible extent the size of a message exchanged between a terminal 70 and the access network 80.

One objective of the geolocation method according to the invention is to reduce the size of the data sent by the terminal 70 concerning the geographical position thereof while enabling the access network 80 to determine the geographical position of the terminal 70 with a precision equivalent to that offered by the positioning device incorporated in the terminal 70.

Figure 2:
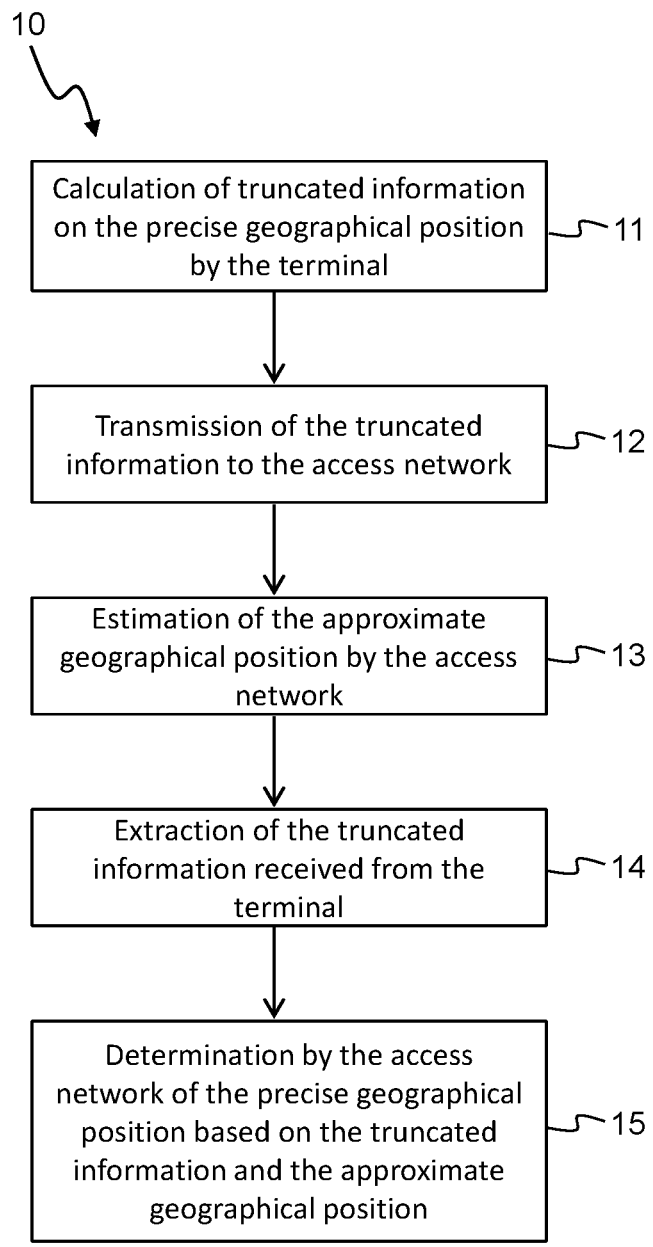
FIG. 2: a schematic representation of the main steps of a geolocation method according to the invention.

FIG. 2 shows schematically the main steps of a geolocation method 10 according to the invention.

Certain steps of the geolocation method 10 are performed by the access network 80 (for example by the server 82 of the access network 80), while other steps of the geolocation method 10 are performed by the terminal 70.

For this purpose, the terminal 70 includes for example a processing circuit including one or more processors and storage means (magnetic hard disk, electronic memory, optical disk, etc.) wherein a computer program product is stored, in the form of a set of program code instructions to be executed for implementing at least some of the steps of the geolocation method 10 according to the invention. Alternatively or in addition, the processing circuit of the terminal 70 includes one or more programmable logic circuits (FPGA, PLD, etc.), and/or one or more specialized integrated circuits (ASIC), and/or a set of discrete electronic components, etc., adapted for implementing said steps of the geolocation method.

A first step of the geolocation method 10 includes a calculation 11 by the terminal 70 of truncated information on a precise geographical position of the terminal 70, obtained by the positioning device of said terminal 70, by breaking down said precise geographical position into a first part and a second part, the first part varying less quickly than the second part when the terminal 70 moves. The truncated information represents the second part of the precise geographical position of the terminal 70.

A second step of the geolocation method 10 includes a sending 12 by the terminal 70 of the truncated information in a message intended for the access network 80.

A third step of the geolocation method 10 includes an estimation 13 of an approximate geographical position of the terminal 70 by the access network, for example using one of the methods mentioned previously.

A fourth step of the geolocation method 10 includes an extraction 14 by the access network 80 of the truncated information from the message received coming from the terminal 70.

A fifth step of the geolocation method 10 includes a determination 15 by the access network 80 of the precise geographical position of the terminal 70 from the truncated information and from the approximate geographical position.

It should be noted that the order of the steps described above is not necessarily fixed.

In the first embodiment, the latitude $Lat_1$ of the precise geographical position obtained by the positioning device of the terminal 70 corresponds for example to an integer value encoded in N bits that can be written in the form:

$$Lat_1 = N_1 \times 2^n + n_1$$

where $N_1$, $n_1$, and n are positive integer numbers. The number $n_1$ thus corresponds to the value encoded by the n least significant bits of the latitude $Lat_1$ of the precise geographical position of the terminal 70, while the number $N_1$ corresponds to the value encoded by the (N-n) most significant bits of the latitude $Lat_1$ of the precise geographical position of the terminal 70.

The longitude $Lng_1$ of the precise geographical position obtained by the positioning device of the terminal 70 corresponds for example to an integer value encoded in M bits that can be written in the form:

$$Lng_1 = M_1 \times 2^m + m_1$$

where $M_1$, $m_1$, and m are positive integer numbers. The number $m_1$ thus corresponds to the value encoded by the m least significant bits of the longitude $Lng_1$ of the precise geographical position of the terminal 70, while the number $M_1$ corresponds to the value encoded by the (M-m) most significant bits of longitude $Lng_1$ of the precise geographical position of the terminal 70.

In a similar manner, the latitude $Lat_2$ and the longitude $Lng_2$ of the approximate geographical position estimated by the access network 80 can be written in the form:

$$Lat_2 = N_2 \times 2^n + n_2$$

$$Lng_2 = M_2 \times 2^m + m_2$$

where $N_2$, $n_2$, $M_2$, and $m_2$ are positive integer numbers, the number $n_2$ corresponds to the value encoded by the n least significant bits of the latitude $Lat_2$ of the approximate geographical position of the terminal 70 estimated by the access network 80, the number $N_2$ corresponds to the value encoded by the (N-n) most significant bits of the latitude $Lat_2$ of the estimated approximate geographical position, the number $m_2$ corresponds to the value encoded by the m least significant bits of the longitude $Lng_2$ of the estimated approximate geographical position, and the number $M_2$ corresponds to the value encoded by the (M-m) most significant bits of the longitude $Lng_2$ of the estimated approximate geographical position.

The truncated information includes the n least significant bits of the latitude $Lat_1$ and the m least significant bits of the longitude $Lng_1$ of the precise geographical position obtained by the terminal 70.

When the terminal 70 moves, the least significant bits of the latitude $Lat_1$ and of the longitude $Lng_1$ of the precise position of the terminal 70 vary more quickly than the most significant bits.

Figure 3:
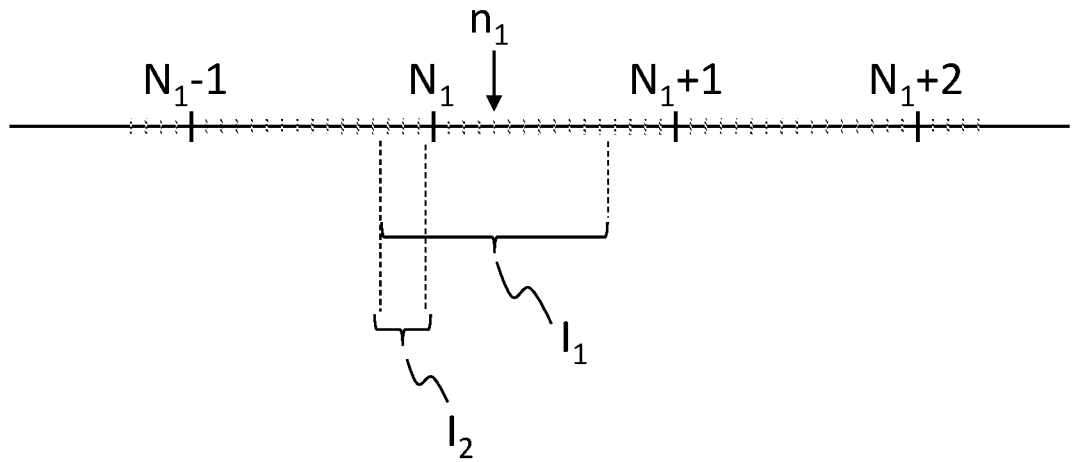
FIGS. 3 and 4: schematic representations of a latitude of a geographical position of a terminal.

FIG. 3 shows schematically a case where n=4. There are then sixteen possible values for the number $n_1$, which varies between zero and fifteen. When the terminal 70 moves for example between a first latitude of value $N_1 \times 2^4$ and a second latitude of value $(N_1+1) \times 2^4$, the number $n_1$ successively takes the values zero to fifteen.

The access network 80 can determine the precise geographical position of the terminal 70 using firstly the values $n_1$ and $m_1$ determined from the truncated information extracted from the message received from the terminal 70, and secondly the values $N_2$ and $M_2$ determined from the approximate geographical position of the terminal 70 estimated by the access network 80.

Supposing for example that the precision of the precise geographical position obtained by the terminal 70 and the precision of the approximate geographical position estimated by the access network 80 are such that, whatever the position of the terminal 70, the following formulae are satisfied:

$$|Lat_1 - Lat_2| < 2^{(n-1)} \quad (1)$$

$$|Lng_1 - Lng_2| < 2^{(m-1)} \quad (2)$$

then the access network 80 can determine the latitude $Lat_1$ and the longitude $Lng_1$ of the precise geographical position of the terminal 70 as follows:

$$Lat_1 = \begin{cases} (N_2+1) \times 2^n + n_1 & \text{if } (n_1 - n_2) \leq (-1) \times 2^{(n-1)} \\ (N_2-1) \times 2^n + n_1 & \text{if } (n_1 - n_2) \geq 2^{(n-1)} \\ N_2 \times 2^n + n_1 & \text{otherwise} \end{cases} \quad (3)$$

$$Lng_1 = \begin{cases} (M_2+1) \times 2^m + m_1 & \text{if } (m_1 - m_2) \leq (-1) \times 2^{(m-1)} \\ (M_2-1) \times 2^m + m_1 & \text{if } (m_1 - m_2) \geq 2^{(m-1)} \\ M_2 \times 2^m + m_1 & \text{otherwise} \end{cases} \quad (4)$$

Figure 4:
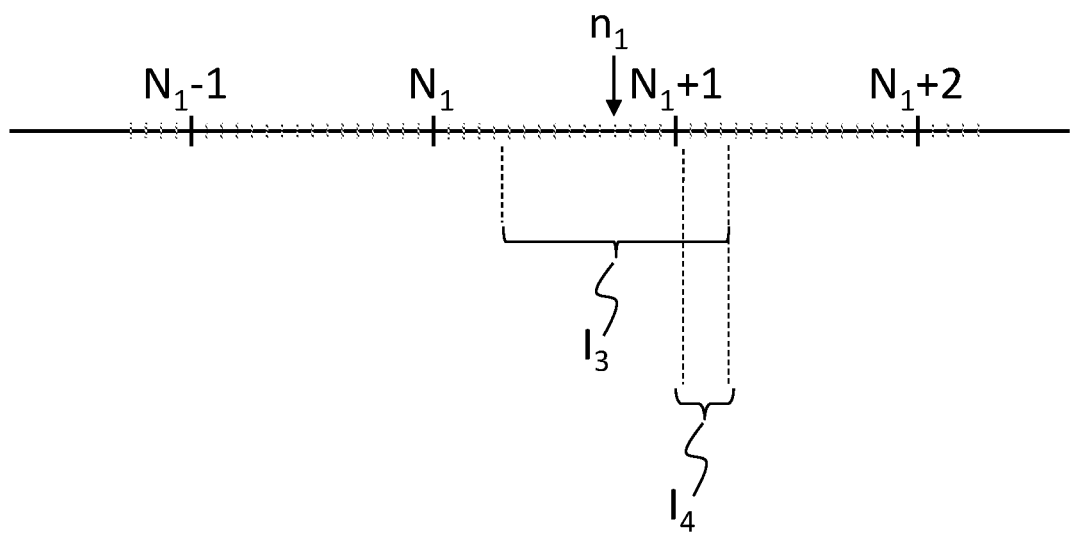

FIGS. 3 and 4 assist in better understanding these calculations.

In FIG. 3, the formula (1) means that the number $n_2$ necessarily takes a value in the interval $I_1$. If $n_2$ takes a value in the sub-interval $I_2$ for which $(n_1-n_2) \leq (-1) \times 2^{(n-1)}$, then this means that $N_2=(N_1-1)$. Otherwise this means that $N_2=N_1$.

In FIG. 4, the formula (1) means that the number $n_2$ takes a value in the sub-interval 13. If $n_2$ takes a value in the interval 14 for which $(n_1-n_2) \geq 2^{(n-1)}$, then this means that $N_2=(N_1+1)$. Otherwise this means that $N_2=N_1$.

It should be noted that what is described above for the latitude with reference to FIGS. 3 and 4 applies in a similar manner for the longitude.

It is thus clear that the access network 80 can determine the precise geographical position ($Lat_1$, $Lng_1$) of the terminal 70 from firstly the truncated information sent by the terminal 70 and secondly from the approximate geographical position of the terminal 70 estimated by the access network 80.

It is thus possible for the access network 80 to obtain a precise geographical position of the terminal 70 without the terminal 70 having to send this geographical position as a whole. It is thus possible to limit the size of the message containing the information on the geographical position of the terminal 70 without reducing the precision of the geolocation. This then makes it possible to optimize the capacity of the network as well as the electrical consumption of the terminal 70.

The numbers n and m can be chosen according to the precision of the approximate geographical position estimated by the access network 80 and the precision of the precise geographical position obtained by the terminal 70, so that the formulae (1) and (2) are satisfied.

Let us take for example the following hypotheses:
N=M=24 bits,
the precision of the precise geographical position obtained by the terminal 70 is such that an error distance between the exact geographical position of the terminal 70 and the precise geographical position measured by the positioning device of the terminal 70 is less than five meters on the surface of the terrestrial globe, and
the precision of the approximate geographical position estimated by the access network 80 is such that an error distance between the exact geographical position of the terminal 70 and the approximate geographical position estimated by the access network 80 is less than one hundred meters on the surface of the terrestrial globe.

With such hypotheses, the formulae (1) and (2) can be satisfied by choosing n=m=8. This is because, in such a case, whatever the geographical position of the terminal 70, the distance on the surface of the terrestrial globe between the precise geographical position obtained by the terminal 70 and the approximate geographical position estimated by the access network 80 is necessarily less than the sum of the maximum error distance (five meters) for the precise geographical position measured by the positioning device of the terminal 70 and the maximum error distance (one hundred meters) for the approximate geographical position estimated by the access network 80. In such a case, the latitude $Lat_1$ and the longitude $Lng_1$ of the precise geographical position obtained by the terminal 70, and the latitude Late and the longitude $Lng_2$ of the approximate geographical position estimated by the access network 80, are necessarily such that:

$$|Lat_1 - Lat_2| < \frac{(100+5) \times (2^{23}-1)}{110{,}000 \times 90} \approx 89.0$$

$$|Lng_1 - Lng_2| < \frac{(100+5) \times (2^{23}-1)}{110{,}000 \times 180} \approx 44.5$$

The formulae (1) and (2) are then satisfied by choosing n=m=8 (for the record, in these formulae, the number 110,000 corresponds to the approximate distance in meters on the surface of the terrestrial globe corresponding to one degree of arc).

Let us imagine for example that the precise geographical position obtained by the terminal 70 is:

$(Lat_1, Lng_1) = (0x\ 3E\ 03\ D7, 0x\ 01\ 06\ D1)$.

where the notation "0x" indicates a hexadecimal representation.

The steps of the geolocation method 10 according to the invention described with reference to FIG. 2 are then as follows.

The method 10 includes first of all a calculation 11 by the terminal 70 of truncated information including the n least significant bits of $Lat_1$ and the m least significant bits of $Lng_1$. In the example considered:

$Lat_1 = N_1 \times 2^n + n_1$, with $N_1 = 0x\ 3E\ 03$ and $n_1 = 0x\ D7$ $Lng_1 = M_1 \times 2^m + m_1$, with $M_1 = 0x\ 01\ 06$ and $m_1 = 0x\ D1$ The values $n_1$ and $m_1$ correspond respectively to the values encoded by the n least significant bits of the latitude $Lat_1$ and the m least significant bits of the longitude $Lng_1$ of the precise geographical position obtained by the terminal 70.

The method 10 next includes a sending 12 by the terminal 70 of the truncated information in a message intended for the access network 80. The n least significant bits of the latitude $Lat_1$ and the m least significant bits of the longitude $Lng_1$ of the precise geographical position obtained by the terminal 70 are thus included in a message sent to the access network 80.

The method 10 next includes an estimation 13 of an approximate geographical position of the terminal 70 by the access network. For example, the approximate geographical position estimated by the access network 80 is:

$(Lat_2, Lng_2) = (0x\ 3E\ 04\ 1A, 0x\ 01\ 06\ 6D)$

In the example in question:

$Lat_2 = N_2 \times 2^n + n_2$, with $N_2 = 0x\ 3E\ 04$ and $n_2 = 0x\ 1A$ $Lng_2 = M_2 \times 2^m + m_2$, with $M_2 = 0x\ 01\ 06$ and $m_2 = 0x\ 6D$ The method 10 next includes an extraction 14 by the access network 80, from the message received coming from the terminal 70, of the truncated information.

The method 10 next includes a determination 15 by the access network 80 of the precise geographical position of the terminal 70 from the truncated information and from the approximate geographical position using the formulae (3) and (4):

$(n_1 - n_2) = 189 > 2^7 = > Lat_1 = (N_2 - 1) \times 2^n + n_1$ $(m_1 - m_2) = 100 < 2^7 = > Lng_1 = M_2 \times 2^m + M_1$ This then gives:

$(Lat_1, Lng_1) = (0x\ 3E\ 03\ D7, 0x\ 01\ 06\ D1) = (43.60°N, 1.44°E)$

In the above example, the geolocation method 10 according to the invention makes it possible to reduce the size of the data sent by the terminal 70 to the access network 80 (only 16 bits transmitted instead of 48 bits) while keeping an equivalent geolocation precision.

According to another example, the method 10 according to the invention can make it possible to increase the precision of geolocation of the terminal 70 while keeping the same quantity of data sent. For example, by choosing N=M=32 and n=m=24, it is possible to define a geographical position of the terminal 70 with a precision of around a centimeter, subject to the positioning device of the terminal 7 allowing such precision), and a precision of around 35 km is then sufficient for estimating the approximate geographical position by the access network 80.

Another advantage of the geolocation method 10 according to the invention is that it adds confidentiality to the data transmitted since the truncated information sent in a message by the terminal 70 to the access network 80 is not sufficient by itself to determine the position of the terminal 70. Thus, if the message were intercepted by a malevolent entity, the latter would not be capable of determining the position of the terminal 70 from the content of the intercepted message.

It should be noted that the first embodiment described above is merely an in no way limitative example and that other variants can consequently be envisaged.

Figure 5:
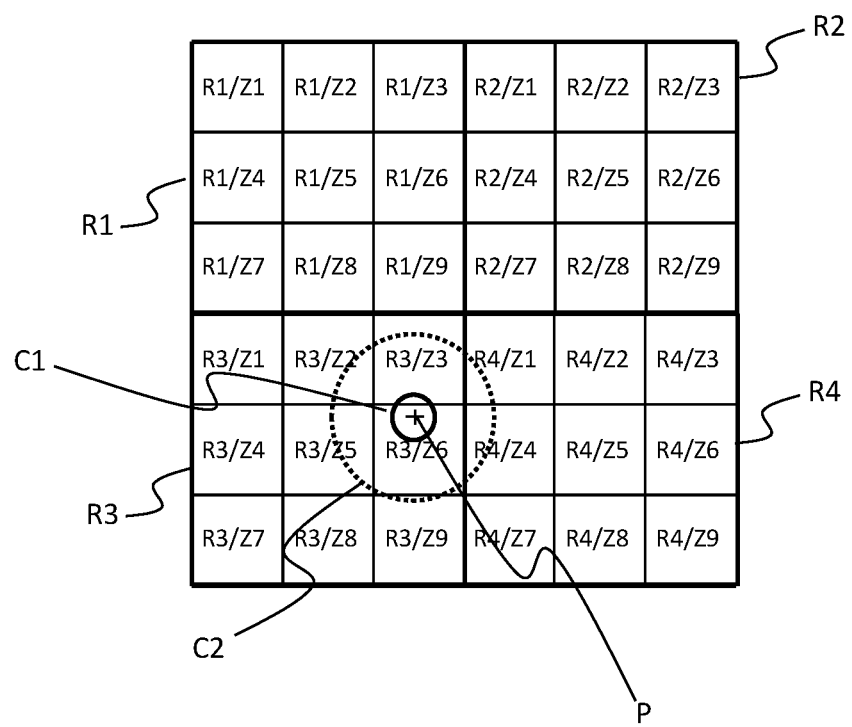
FIG. 5: a schematic representation of a geographical position of a terminal in a territory marked in a grid in various regions and various zones.

For example, in a second embodiment, the geographical position of the terminal 70 includes a region identifier and a zone identifier. FIG. 5 shows schematically a division of a geographical territory into a grid of various regions R1 to R4 and various zones Z1 to Z9. The territory is first of all divided into various regions R1 to R4 in square form. The various regions R1 to R4 all have the same dimensions. Each region is next divided into various zones Z1 to Z9. They are also in square form and all have identical dimensions. As illustrated in FIG. 5, the various zones Z1 to Z4 are numbered in an identical scheme in each region R1 to R4. In the example shown in FIG. 5, there are only four regions R1 to R4 and each region R1 to R4 includes nine zones Z1 to Z9. It will of course be possible to envisage using a larger number of regions and/or a larger number of zones and/or different forms of zone and/or region.

In this second embodiment, the terminal 70 has a positioning device that makes it possible to determine in which region R1 to R4 and in which zone Z1 to Z9 of this region the terminal 70 is located. In the example shown in FIG. 5, the terminal 70 is located at the exact geographical position P in the zone R3/Z6, and the precision of the positioning device of the terminal 70 is such that the precise geographical position of said terminal 70 obtained by the positioning device is within the circle C1. In this example, the precise geographical position obtained by the terminal 70 is therefore either R3/Z3 or R3/Z6. The precision of the estimation of the approximate geographical position of the terminal 70 by the access network 80 is such that it is situated inside the circle C2. In this example, the approximate geographical position obtained by the terminal 70 is therefore one from among R3/Z2, R3/Z3, R4/Z1, R3/Z5, R3/Z6, R4/Z4 or R3/Z9.

Each region R1 to R4 and each zone Z1 to Z9 has for example an identifier. Each region identifier R1 to R4 is unique, and each identifier of a zone Z1 to Z9 is unique within the same region R1 to R4. In the example in question, it is possible to encode a region identifier R1 to R4 in two bits (since there are four different values to be encoded) and a zone identifier Z1 to Z9 in four bits (since there are nine values to be encoded). A geographical position can be broken down into two parts: a region identifier and a zone identifier. When the terminal 70 moves, the zone identifier varies more quickly than the region identifier. The truncated information calculated by the terminal 70 corresponds to the zone identifier. This truncated information is sent in a message intended for the access network 80.

If the precision of the estimation of the approximate geographical position is sufficient, the access network 80 is then capable of determining which region R1 to R4 and which zone Z1 to Z9 of this region correspond to the precise geographical position obtained by the terminal 70 from firstly the truncated information sent by the terminal 70 and secondly from the approximate geographical position estimated by the access network 80.

This is because, in the example in question, it suffices for the precision of the approximate geographical position estimated by the access network 80 to be such that the circle C2 has a radius smaller than one side of a zone Z1 to Z9, so that the circle C2 cannot include two zone portions Z1 to Z9 having the same identifier. The access network 80 can then determine the precise geographical position of the terminal 70 as being the zone Z1 to Z9 closest to the approximate position estimated by the access network 80 that has the same zone identifier as the one corresponding to the truncated information sent by the terminal 70.

There again, the access network 80 is capable of determining a precise geographical position of the terminal 70 from truncated information sent by the terminal 70 and from an approximate geographical position of the terminal 70 estimated by the access network 80.

The above description illustrates clearly that, through its various features and the advantages thereof, the present invention achieves the objectives set. In particular, it makes it possible to determine the geographical position of a terminal 70 of a wireless communication system 60 precisely while limiting the quantity of information exchanged between the terminal 70 and an access network 80 of said communication system 60.

The invention applies particularly well to wireless communication systems of the IoT type for applications requiring geolocation. The invention can nevertheless apply to other types of wireless communication system for which it may be advantageous to limit the size of the data sent by a terminal that are necessary to the system for geolocating it with sufficient precision.

The invention claimed is:

1. A method for geolocating a terminal of a wireless communication system, the wireless communication system comprising an access network configured to estimate an approximate geographical position of the terminal, the terminal comprising a positioning device to obtain a precise geographical position of the terminal, a precision obtained by the terminal being better than the precision of the approximate geographical position estimated by the access network, the precise and approximate geographical positions comprising a latitude and a longitude as geographical coordinates, the method comprising:

calculation by the terminal of truncated information on the precise geographical position by breaking down the precise geographical position into a first part and a second part, the first part varying less quickly than the second part when the terminal moves, the truncated information representing the second part of the precise geographical position;

transmission by the terminal of the truncated information in a message to the access network;

estimation of the approximate geographical position of the terminal by the access network;

extraction by the access network of the truncated information from the message received from the terminal;

determination by the access network of the precise geographical position of the terminal from the truncated information and from the approximate geographical position; and wherein:

the latitude and the longitude, each corresponding to a value encoded respectively in N and M bits;

a latitude $Lat_1$ and a longitude $Lng_1$ of the precise geographical position obtained by the terminal being written in a form:

$$Lat_1 = N_1 \times 2^n + n_1$$

$$Lng_1 = M_1 \times 2^m + m_1$$

where $N_1$, $n_1$, n, $M_1$, $m_1$ and m are positive integer numbers, $n_1$ and $m_1$ corresponding respectively to the n least significant bits of the latitude $Lat_1$ and to the m least significant bits of the longitude $Lng_1$ of the precise geographical position obtained by the terminal;

a latitude $Lat_2$ and a longitude $Lng_2$ of the approximate geographical position estimated by the access network being written in a form:

$$Lat_2 = N_2 \times 2^n + n_2$$

$$Lng_2 = M_2 \times 2^m + m_2$$

where $N_2$, $n_2$, $M_2$ and $m_2$ are positive integer numbers, $n_2$ and $m_2$ corresponding respectively to the n least significant bits of the latitude $Lat_2$ and to the m least significant bits of the longitude $Lng_2$ of the approximate geographical position estimated by the access network;

the truncated information comprises the n least significant bits of the latitude $Lat_1$ and the m least significant bits of the longitude $Lng_1$ of the precise geographical position obtained by the terminal;

the determination by the access network of the precise geographical position of the terminal from the truncated information and from the approximate geographical position comprises:

determination of the latitude $Lat_1$ as a function of $N_2$, $n_1$, and a difference between $n_1$ and $n_2$, and determination of the longitude $Lng_1$ as a function of $M_2$ and of $m_1$, and a difference between $m_1$ and $m_2$.

2. The method of claim 1, wherein:
the numbers n and m are chosen so that the precision of the approximate geographical position estimated by the access network, regardless of the geographical position of the terminal, satisfies a following formulae:

$$|Lat_1-Lat_2|<2^{(n-1)}$$

$$|Lng_2-Lng_2|<2^{(n-1)}$$

the determination by the access network of the latitude $Lat_1$ of the precise geographical position of the terminal is in accordance with:

$$Lat_1 = \begin{cases} (N_2+1)\times 2^n + n_1 & \text{if } (n_1-n_2) \le (-1)\times 2^{(n-1)} \\ (N_2-1)\times 2^n + n_1 & \text{if } (n_1-n_2) \ge 2^{(n-1)} \\ N_2 \times 2^n + n_1 & \text{otherwise} \end{cases}$$

the determination by the access network of the longitude $Lng_1$ of the precise geographical position of the terminal is in accordance with:

$$Lng_1 = \begin{cases} (M_2+1)\times 2^m + m_1 & \text{if } (m_1-m_2) \le (-1)\times 2^{(m-1)} \\ (M_2-1)\times 2^m + m_1 & \text{if } (m_1-m_2) \ge 2^{(m-1)} \\ M_2 \times 2^m + m_1 & \text{otherwise} \end{cases}.$$

3. The method of claim 1, wherein the estimation of the approximate geographical position by the access network is obtained by one of the following methods:
- a multilateration method based on a propagation time of a radio signal exchanged between the terminal and the access network;
- a multilateration method based on a received power level for a radio signal exchanged between the terminal and the access network;
- determination of the geographical position of the terminal from geographical positions of one or more base stations, the terminal being located within a coverage area of said one or more base stations; and
- an automatic learning method for associating a radio signal with a geographical position.

4. The method of claim 1, wherein the access network is a wireless low power wide area network.

5. A wireless communication system comprising a terminal and an access network, wherein the terminal is configured to:
calculate truncated information on a precise geographical position by breaking down the precise geographical position into a first part and a second part, the first part varying less quickly than the second part when the terminal moves, the truncated information representing the second part of the precise geographical position; and
transmit the truncated information in a message to the access network of the wireless communication system;
wherein the access network is configured to:
estimate an approximate geographical position of the terminal;
extract the truncated information from the message received from the terminal;
determine the precise geographical position of the terminal from the truncated information and from the approximate geographical position, the precise and approximate geographical positions comprising a latitude and a longitude as geographical coordinates; and
wherein:
the latitude and the longitude, each corresponding to a value encoded respectively in N and M bits;
a latitude $Lat_1$ and a longitude $Lng_1$ of the precise geographical position obtained by the terminal being written in a form:

$$Lat_1 = N_1 \times 2^n + n_1$$

$$Lng_1 = M_1 \times 2^m + m_1$$

where $N_1$, $n_1$, n, $M_1$, $m_1$ and m are positive integer numbers, $n_1$ and $m_1$ corresponding respectively to the n least significant bits of the latitude $Lat_1$ and to the m least significant bits of the longitude $Lng_1$ of the precise geographical position obtained by the terminal;
a latitude $Lat_2$ and a longitude $Lng_2$ of the approximate geographical position estimated by the access network being written in a form:

$$Lat_2 = N_2 \times 2^n + n_2$$

$$Lng_2 = M_2 \times 2^m + m_2$$

where $N_2$, $n_2$, $M_2$ and $m_2$ are positive integer numbers, $n_2$ and $m_2$ corresponding respectively to the n least significant bits of the latitude $Lat_2$ and to the m least significant bits of the longitude $Lng_2$ of the approximate geographical position estimated by the access network;
the truncated information comprises the n least significant bits of the latitude $Lat_1$ and the m least significant bits of the longitude $Lng_1$ of the precise geographical position obtained by the terminal;
the determination by the access network of the precise geographical position of the terminal from the truncated information and from the approximate geographical position comprises:
determination of the latitude $Lat_1$ as a function of $N_2$, $n_1$, and a difference between $n_1$ and $n_2$; and
determination of the longitude $Lng_1$ as a function of $M_2$ and of $m_1$, and a difference between $m_1$ and $m_2$.

* * * * *